US011892785B2

(12) United States Patent
Ono et al.

(10) Patent No.: US 11,892,785 B2
(45) Date of Patent: Feb. 6, 2024

(54) INORGANIC COMPOUND PARTICLE SUPPLY MEMBER, TRANSFER DEVICE, AND IMAGE FORMING APPARATUS

(71) Applicant: FUJIFILM Business Innovation Corp., Tokyo (JP)

(72) Inventors: Masato Ono, Kanagawa (JP); Masayuki Seko, Kanagawa (JP); Koichi Matsumoto, Kanagawa (JP); Daisuke Tanemura, Kanagawa (JP); Masato Furukawa, Kanagawa (JP); Hiroaki Tanaka, Kanagawa (JP); Yosuke Kubo, Kanagawa (JP); Shigeru Fukuda, Kanagawa (JP); Iori Nishimura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/980,616

(22) Filed: Nov. 4, 2022

(65) Prior Publication Data

US 2023/0350325 A1 Nov. 2, 2023

(30) Foreign Application Priority Data

Apr. 28, 2022 (JP) ................................ 2022-075114

(51) Int. Cl.
*G03G 15/20* (2006.01)
*G03G 15/16* (2006.01)

(52) U.S. Cl.
CPC ......... *G03G 15/162* (2013.01); *G03G 15/161* (2013.01)

(58) Field of Classification Search
CPC ............... G03G 15/161; G03G 15/162; G03G 15/2053; G03G 15/206; G03G 21/0011; G03G 21/0017; G03G 9/0902
See application file for complete search history.

(56) References Cited

U.S. PATENT DOCUMENTS

2009/0003905 A1* 1/2009 Ueno ................. G03G 21/0017 399/350
2014/0294443 A1* 10/2014 Klenkler ............ G03G 21/0011 399/346
2015/0316889 A1* 11/2015 Uchino .............. G03G 9/08773 399/346

FOREIGN PATENT DOCUMENTS

JP 2011-039505 A 2/2011

* cited by examiner

*Primary Examiner* — Hoang X Ngo
(74) *Attorney, Agent, or Firm* — Sughrue Mion, PLLC

(57) ABSTRACT

An inorganic compound particle supply member includes inorganic compound particles, and the Young's modulus of the inorganic compound particle supply member is lower than the Young's modulus of a supply object to be supplied with the inorganic compound particles.

20 Claims, 2 Drawing Sheets

INORGANIC COMPOUND PARTICLE SUPPLY MEMBER, TRANSFER DEVICE, AND IMAGE FORMING APPARATUS

CROSS-REFERENCE TO RELATED APPLICATIONS

This application is based on and claims priority under 35 USC 119 from Japanese Patent Application No. 2022-075114 filed Apr. 28, 2022.

BACKGROUND

(i) Technical Field

The present disclosure relates to an inorganic compound particle supply member, a transfer device, and an image forming apparatus.

(ii) Related Art

Japanese Unexamined Patent Application Publication No. 2011-039505 discloses a blade member formed by molding a mixture of urethane and 1 to 30 parts by mass of an inorganic filler having a specific gravity of 2.0 or more and a thin-sheet shape with an aspect ratio of 3 or more.

SUMMARY

Aspects of non-limiting embodiments of the present disclosure relate to an inorganic compound particle supply member capable of supplying inorganic compound particles to a supply object.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an inorganic compound particle supply member including inorganic compound particles, wherein the Young's modulus of the inorganic compound particle supply member is lower than the Young's modulus of a supply object to be supplied with the inorganic compound particles.

BRIEF DESCRIPTION OF THE DRAWINGS

Exemplary embodiments of the present disclosure will be described in detail based on the following figures, wherein.

DETAILED DESCRIPTION

Figure 1:
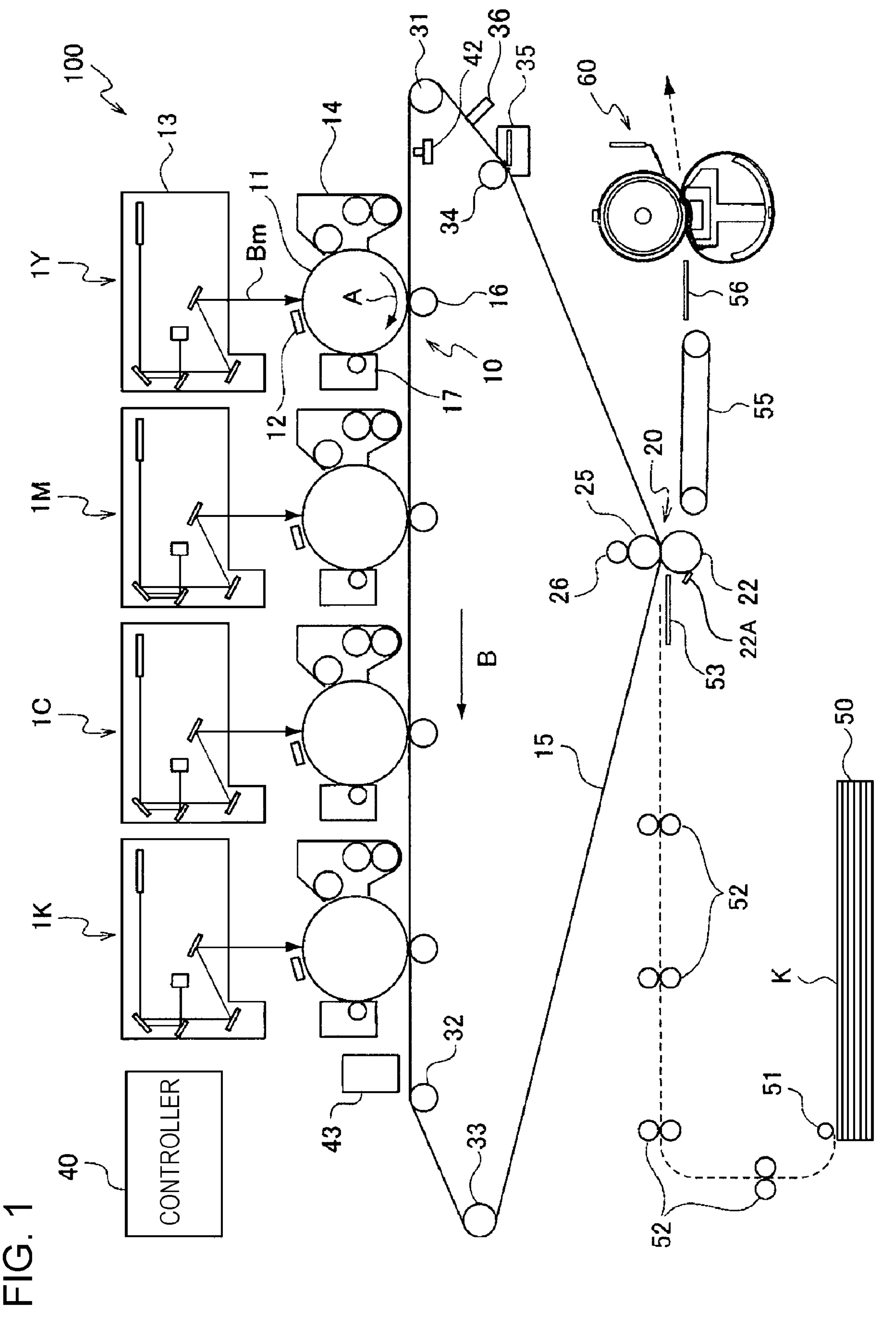
FIG. 1 is a schematic configuration diagram showing an example of an image forming apparatus according to a first exemplary embodiment.

An exemplary embodiment of the present disclosure is described below. The description and examples illustrate the present disclosure, and the scope of the present disclosure is not limited.

In the numerical ranges stepwisely described in the exemplary embodiment, the upper limit value or the lower limit value described in one of the numerical ranges may be replaced by the upper limit value or the lower limit value in another numerical range stepwisely described. In addition, in a numerical range described in the exemplary embodiment, the upper limit value or the lower limit value of the numerical range may be replaced by the value described in an example.

In the exemplary embodiment, the term "process" includes not only an independent process but also even a process which cannot be distinguished from another process as long as the initial object of the process is achieved. In the exemplary embodiment, when the exemplary embodiment is described with reference to the drawings, the configuration of the exemplary embodiment is not limited to the configurations shown in the drawings. Also, in each of the drawings, the size of a member is conceptual, and the relative relation between the sizes of members is not limited to this.

In addition, each component may contain plural materials corresponding to the component. In description of the amount of each of the components in a composition, when plural materials corresponding to each of the components are present in a composition, the amount of each of the components represents the total amount of the plural materials present in the composition unless otherwise specified.

[Transfer Device]

An inorganic compound particle supply member according to the exemplary embodiment of the present disclosure contains inorganic compound particles, and the Young's modulus thereof is lower than that of a supply object to be supplied with the inorganic compound particles.

The inorganic compound particle supply member according to the exemplary embodiment has the configuration described above and thus can supply the inorganic compound particles to the supply object.

In the field of an electrophotographic apparatus, in a transfer device in which the outer peripheral surface of an intermediate transfer body is cleaned by a cleaning blade, transferability of a toner image to embossed paper (that is, a recording medium having large surface unevenness, such as embossed paper) is decreased. In particular, when a toner containing fatty acid metal salt particles as an external additive or a device which supplies a fatty acid metal salt is used for the purpose of improving transferability of a toner image to embossed paper, transferability of a toner image to embossed paper is decreased. This is because the fatty acid metal salt supplied to the outer peripheral surface of an intermediate transfer body is degraded by discharge during the transfer of the toner image, thereby increasing adhesive force.

While when the inorganic compound particle supply member according to the exemplary embodiment is applied, the Young's modulus thereof is lower than that of an intermediate transfer body serving as the supply object, and thus the supply member is abraded by sliding with the rotated intermediate transfer body. In association with the abrasion, the inorganic compound particles are supplied to the outer peripheral surface of the intermediate transfer body, and reach and accumulate in the contact part between the intermediate transfer body and the cleaning blade. The accumulated inorganic compound particles stay in the contact part between the intermediate transfer body and the cleaning blade and function as an abrasive material, thereby improving the cleaning property of the cleaning blade for the intermediate transfer body. Consequently, an increase in adhesive force to the intermediate transfer body is suppressed, and thus a decrease in transferability of a toner image to embossed paper is suppressed.

The abode description is made of the case where the inorganic compound particle supply member is applied to the transfer device, but a fixing member, a device which cleans a recording medium transport body by a cleaning blade may be used as the supply object. Therefore, the cleaning property for the fixing member and the recording medium transport body is improved.

Also, the inorganic compound particle supply member according to the exemplary embodiment may be applied to a device required to be supplied with inorganic compound particles in an image forming apparatus.

Details of the inorganic compound particle supply member according to the exemplary embodiment are described below.

(Young's Modulus of Inorganic Compound Particle Supply Member)

The Young's modulus of the inorganic compound particle supply member according to the exemplary embodiment is lower than that of the supply object to be supplied with the inorganic compound particles.

Specifically, in the inorganic compound particle supply member, the Young's modulus of the contact part with the supply object is lower, in the supply object, than the Young's modulus of the contact part with the inorganic compound particle supply member.

The ratio (Young's modulus of inorganic compound particle supply member/Young's modulus of supply object) of the Young's modulus of the inorganic compound particle supply member to the Young's modulus of the supply object is preferably 0.1 or less, more preferably 0.05 or less, and still more preferably 0.01 or less.

When the ratio (Young's modulus of inorganic compound particle supply member/Young's modulus of supply object) of the Young's modulus of the inorganic compound particle supply member to the Young's modulus of the supply object is within the range described above, the inorganic compound particle supply member is moderately abraded by sliding between the inorganic compound particle supply member and the supply object, and thus the inorganic compound particles can be stably supplied to the supply object.

In particular, when the inorganic compound particle supply member is applied to a transfer device in which the outer peripheral surface of the intermediate transfer body is cleaned by a cleaning blade, a decrease in transferability of a toner image to embossed paper is suppressed.

However, from the viewpoint of suppressing excessive abrasion of the inorganic compound particle supply member, the ratio (Young's modulus of inorganic compound particle supply member/Young's modulus of supply object) of the Young's modulus of the inorganic compound particle supply member to the Young's modulus of the supply object is preferably 0.001 or more.

The Young's modulus of the inorganic compound particle supply member is preferably 1500 Mpa or less, more preferably 350 Mpa or less, and still more preferably 100 Mpa or less.

When the Young's modulus of the inorganic compound particle supply member is within the range described above, the inorganic compound particle supply member is properly abraded by sliding between the inorganic compound particle supply member and the supply object, and thus the inorganic compound particles can be stably supplied to the supply object.

In particular, when the inorganic compound particle supply member is applied to a transfer device in which the outer peripheral surface of the intermediate transfer body is cleaned by a cleaning blade, a decrease in transferability of a toner image to embossed paper is suppressed.

However, from the viewpoint of suppressing excessive abrasion of the inorganic compound particle supply member, the Young's modulus of the inorganic compound particle supply member is preferably 3 Mpa or more.

The Young's modulus of the inorganic compound particle supply member can be adjusted by the type and content of the inorganic compound particles and the type of a binder resin.

The Young's modulus of each of the inorganic compound particle supply member and the supply object can be measured by a nanoindentation method, and specifically measured as follows.

An indentation depth-load curve is measured by using a nanoindenter (manufactured by Fischer Instruments K. K., product name, PICODENTOR HM500) and an intender type: 115° triangular pyramid indenter, Berkovich-type diamond intender, and when a load is applied with a maximum indentation depth of 500 nm and then removed, the gradient of an unloading curve is determined as the Young's modulus.

The measurement conditions are set to the standard conditions, such as a temperature of 23° C. and a humidity of 65% RH, specified by Japanese Industrial Standards.

In addition, the measurement positions of the Young's modulus include the contact part with the supply object in the inorganic compound particle supply member and the contact part with the inorganic compound particle supply member in the supply object.

(Configuration of Inorganic Compound Particle Supply Member)

The inorganic compound particle supply member according to the exemplary embodiment contains the inorganic compound particles. Specifically, the inorganic compound particle supply member contains, for example, the inorganic compound particles and a binder resin which bonds together the inorganic compound particles.

In the inorganic compound particle supply member according to the exemplary embodiment, a region containing the inorganic compound particles is a region to be abraded for supplying the inorganic compound particles to the supply object. The content and the like of the inorganic compound particles are also intended for the region.

That is, in the inorganic compound particle supply member according to the exemplary embodiment, a region not to be abraded may be a region not containing the inorganic compound particles.

—Inorganic Compound Particles—

Examples of the inorganic compound particles include metal oxide particles (silica particles, titania particles, alumina particles, cerium oxide particles, magnesium oxide particles, zinc oxide particles, zirconia particles, and the like), carbide particles (silicon carbide particles and the like), nitride particles (boron nitride particles and the like), pyrophosphate salt particles (calcium pyrophosphate particles and the like), carbonate salts (calcium carbonate, barium carbonate, and the like), metal titanate salt particles (barium titanate, magnesium titanate, calcium titanate, strontium titanate, and the like), and sulfide particles (tungsten disulfide and the like).

Among these, metal oxide particles, particularly silica particles, are preferred as the inorganic compound particles.

When the metal oxide particles (particularly, silica particles) are applied as the inorganic compound particles, the abrasive ability of the inorganic compound particles is enhanced, and thus when the inorganic compound particle supply member is applied to the transfer device in which the outer peripheral surface of the intermediate transfer body is cleaned by a cleaning blade, a decrease in transferability of a toner image to embossed paper is suppressed.

The inorganic compound particles are preferably spherical inorganic compound particles.

Specifically, the aspect ratio of the inorganic compound particles is preferably 2 or less, more preferably 1.8 or less, and still more preferably 1.5 or less. The inorganic compound particles are particularly preferably spherical silica particles.

When the inorganic compound particles are the spherical inorganic compound particles (particular the spherical silica particles), the abrasive ability of the inorganic compound particles is enhanced, and thus when the inorganic compound particle supply member is applied to the transfer device in which the outer peripheral surface of the intermediate transfer body is cleaned by a cleaning blade, a decrease in transferability of a toner image to embossed paper is suppressed.

The aspect ratio of the inorganic compound particles represents the ratio (long-axis length/short-axis length) of the long-axis length to the short-axis length.

The long-axis length of the inorganic compound particles represents the maximum length of the inorganic compound particles.

The short-axis length of the inorganic compound particles represents the maximum length among the lengths in the direction perpendicular to the extension lines of the long-axis lengths of the inorganic compound particles.

The aspect ratio of the inorganic compound particles is an average value of aspect ratios determined for 100 inorganic compound particles by using a scanning electron microscope.

The specific gravity of the inorganic compound particles is preferably 3.0 or less, more preferably 2.8 or less, and still more preferably 2.5 or less.

When the specific gravity of the inorganic compound particles is within the range described above, the abrasive ability of the inorganic compound particles is enhanced, and thus when the inorganic compound particle supply member is applied to the transfer device in which the outer peripheral surface of the intermediate transfer body is cleaned by a cleaning blade, a decrease in transferability of a toner image to embossed paper is suppressed.

However, the specific gravity of the inorganic compound particles is preferably 1.0 or more. This is in order to suppress a decrease in the abrasive ability of the inorganic compound particles.

The specific gravity of the inorganic compound particles is measured as follows.

The specific gravity is measured by using a Le Chatelier pycnometer according to JIS-K-0061, 5-2-1. Operations are as follows.

(1) First. 250 ml of ethyl alcohol is placed in the Le Chatelier pycnometer and adjusted so that the meniscus is positioned at the scale.

(2) The pycnometer is immersed in a constant-temperature water bath, and when the liquid temperature is 20.0±0.2° C., the position of the meniscus is precisely read from the scale of the pycnometer (precision: 0.025 ml).

(3) Then, 100.000 g of a sample is weighed, and the mass thereof is referred to as "W".

(4) The weighed sample is placed in the pycnometer and then defoamed.

(5) The pycnometer is immersed in a constant-temperature water bath, and when the liquid temperature is 20.0±0.2° C., the position of the meniscus is precisely read from the scape of the pycnometer (precision: 0.025 ml).

(6) The specific gravity is calculated by the following formula.

$$D=W/(L2-L1) \qquad (i)$$

$$S=D/0.9982 \qquad (ii)$$

In the formula, D is the density (20° C.) (g/cm$^3$) of the sample, S is the specific gravity (20° C.) of the sample, W is the apparent mass (g) of the sample, L1 is the reading (20° C.) (ml) of the meniscus before the sample is placed in the pycnometer, L2 is the reading (20° C.) (ml) of the meniscus after the sample is placed in the pycnometer, and 0.9982 is the density (g/cm$^3$) of water at 20° C.

The number-average particle diameter of the inorganic compound particles is preferably 0.005 μm or more and 0.5 μm or less, more preferably 0.01 μm or more and 0.2 μm or less, and still more preferably 0.03 μm or more and 2.0 μm or less.

When the number-average particle diameter of the inorganic compound particles is within the range described above, the abrasive ability of the inorganic compound particles is enhanced, and thus when the inorganic compound particle supply member is applied to the transfer device in which the outer peripheral surface of the intermediate transfer body is cleaned by a cleaning blade, a decrease in transferability of a toner image to embossed paper is suppressed.

The number-average particle diameter of the inorganic compound particles is measured as follows.

The inorganic compound particles are observed by a scanning electron microscope, and the equivalent circle diameter of each of 100 inorganic compound particles to be measured is determined by image analysis. The equivalent circle diameter at a cumulation of number of 50% (at the 50th) from the smaller diameter side in the number-based distribution of the equivalent circle diameters.

In the image analysis for determining the equivalent circle diameters of 100 inorganic compound particles to be measured, a two-dimensional image with a magnification of 10,000 times is photographed, a projection area is determined by using image analysis software WinROOF (manufactured by Mitani Corporation) under the condition of 0.010000 μm/pixel, and the equivalent circle diameter is determined by the formula: Equivalent circle diameter=$2\sqrt{(\text{projection area}/\pi)}$.

The inorganic compound particles may be subjected to, for example, surface hydrophobic treatment with a hydrophobic treatment agent. Examples of the hydrophobic treatment agent include known organic silicon compounds having an alkyl group (for example, a methyl group, an ethyl group, a propyl group, a butyl group, or the like). Specific examples thereof include silazane compounds (for example, silane compounds such as methyltrimethylsilane, dimethyldimethoxysilane, trimethyl chlorosilane, trimethylmethoxysilane, and the like; hexamethyldisilazane, tetramethyldisilazane, and the like), and the like. The hydrophobic treatment agents may be used alone or in combination of two or more.

The content of the inorganic compound particles relative to the inorganic compound particle supply member is preferably 10% by mass or more and 70% by mass or less, more preferably 20% by mass or more and 68% by mass or less, and still more preferably 30% by mass or more and 65% by mass or less.

When the content of the inorganic compound particles is within the range described above, the inorganic compound particles can be stably supplied. In particular, when the inorganic compound particle supply member is applied to the transfer device in which the outer peripheral surface of the intermediate transfer body is cleaned by a cleaning blade, a decrease in transferability of a toner image to embossed paper is suppressed.

—Binder Resin—

Examples of the binder resin include vinyl-based resins composed of a homopolymer of monomers or a copolymer composed of a combination of two or more of these monomers, such as styrenes (for example, styrene, para-chlorostyrene, α-methylstyrene, and the like), (meth)acrylate esters (for example, methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, 2-ethylhexyl methacrylate, and the like), ethylenically unsaturated nitriles (for example, acrylonitrile, methacrylonitrile, and the like), vinyl ethers (for example, vinyl methyl ether, vinyl isobutyl ether, and the like), vinyl ketones (for example, vinyl methyl ketone, vinyl ethyl ketone, vinyl isopropenyl ketone, and the like), olefines (for example, ethylene, propylene, butadiene, and the like), and the like.

Other examples of the binder resin include non-vinyl-based resins such as an epoxy resin, a polyester resin, a polyurethane resin, a polyamide resin, a cellulose resin, a polyether resin, a modified rosin, and the like, a mixture thereof with the vinyl-based resin, a graft polymer produced by polymerizing a vinyl-based monomer in the presence of any one of these resins, and the like.

Among these, a urethane resin is preferred as the binder resin.

(Shape of Inorganic Compound Particle Supply Member)

The shape of the inorganic compound particle supply member is selected according to the supply object supplied with the inorganic compound particles.

For example, when the inorganic compound particle supply member is applied to the transfer device in which the outer peripheral surface of the intermediate transfer body is cleaned by a cleaning blade, the shape of the inorganic compound particle supply member is a shape having a length equivalent to the width of the intermediate transfer body serving as the supply object.

(Application of Inorganic Compound Particle Supply Member)

Examples applicable to the inorganic compound particle supply member include a transfer device in which the outer peripheral surface of an intermediate transfer body (an example of the supply object) is cleaned by a cleaning blade, a fixing device which cleans the outer peripheral surface of a fixing member (an example of the supply object) by a cleaning blade, a recording medium transport device which cleans the outer peripheral surface of a recording medium transport body (an example of the supply object) by a cleaning blade, and the like.

In any one of the devices, the inorganic compound particle supply member is abraded by sliding between the supply object and the inorganic compound particle supply member, and thus the inorganic compound particles are supplied to the supply object (specifically, the contact part between the cleaning blade and the supply object), thereby improving the cleaning property.

Besides the devices described above, examples of usage of the inorganic compound supply member include a device having members required to be improved in slidability therebetween, a member required to be improved in releasability of a toner or adhered material, and the like.

[Transfer Device]

A transfer device according to a first exemplary embodiment of the present disclosure is an intermediate transfer-system transfer device including an intermediate transfer body to whose outer peripheral surface a toner image is transferred, a first transfer device having a first transfer member which first transfers the toner image formed on the surface of an image holding member to the outer peripheral surface of the intermediate transfer body, a second transfer device having a second transfer member which is disposed in contact with the outer peripheral surface of the intermediate transfer body and second transfers the toner image transferred to the outer peripheral surface of the intermediate transfer body to the surface of a recording medium, a cleaning device having a cleaning blade which cleans the outer peripheral surface of the intermediate transfer body, and the inorganic compound particle supply member according to the exemplary embodiment which is disposed in contact with the outer peripheral surface of the intermediate transfer body and supplies inorganic compound particles to the outer peripheral surface of the intermediate transfer body.

There are the following modes of arrangement position of the inorganic compound particle supply member.

Mode 1: The mode in which the inorganic compound particle supply member is disposed in contact with the outer peripheral surface of the intermediate transfer body on the upstream side of the first transfer member in the rotational direction of the intermediate transfer body and on the downstream side of the cleaning blade in the rotational direction of the intermediate transfer body.

Mode 2: The mode in which the inorganic compound particle supply member is disposed in contact with the outer peripheral surface of the intermediate transfer body on the downstream side of the second transfer member in the rotational direction of the intermediate transfer body and on the upstream side of the cleaning blade in the rotational direction of the intermediate transfer body.

A transfer device according to a second exemplary embodiment of the present disclosure is a direct transfer-system transfer device including a recording medium transport body which transports a recording medium, a transfer member which transfers the toner image formed on the surface of an image holding member to the recording medium transport body, a cleaning device having a cleaning blade which cleans the outer peripheral surface of the recoding medium transport body, and the inorganic compound particle supply member according to the exemplary embodiment which is disposed in contact with the outer peripheral surface of the recording medium transport body and supplies inorganic compound particles to the outer peripheral surface of the recording medium transport body.

There are the following modes of the arrangement position of the inorganic compound particle supply member.

Mode 1: The mode in which the inorganic compound particle supply member is disposed in contact with the outer peripheral surface of the recording medium transport body on the upstream side of the transfer member in the rotational direction of the recording medium transport body and on the downstream side of the cleaning blade in the rotational direction of the recording medium transport body.

Mode 2: The mode in which the inorganic compound particle supply member is disposed in contact with the outer peripheral surface of the recording medium transport body on the downstream side of the transfer member in the rotational direction of the recording medium transport body and on the upstream side of the cleaning blade in the rotational direction of the recording medium transport body.

(Intermediate Transport Body)

(Layer Configuration)

The intermediate transfer body may have any one of a roll shape and a belt shape, but a belt shape is preferred.

Specifically, the intermediate transfer body is, for example, a single-layer body having a polyimide-based resin layer or a laminate having a polyimide-based resin layer as the outermost surface layer.

That is, the intermediate transfer body preferably has an outer peripheral surface configured by a polyimide-based resin layer. In particular. The polyimide-based resin layer is hard to shave by the cleaning blade, and thus the degraded fatty acid metal salt is hardly removed. However, cleanability of the cleaning blade is enhanced by the inorganic compound particles supplied from the inorganic compound particle supply member according to the exemplary embodiment, and thus an increase in adhesive force of the degraded fatty acid metal salt to the intermediate transfer body is suppressed.

When the intermediate transfer body is configured by a laminate having a polyimide-based resin layer as the outermost surface layer, the intermediate transfer body having a polyimide-based resin layer provided on a resin substrate layer is used. In addition, an intermediate layer (an elastic layer or the like) may be provided between the substrate layer and the polyimide-based resin layer.

Further, known layers used for the intermediate transfer body are applied to the resin substrate layer and the intermediate layer (elastic layer or the like).

The outer peripheral surface of the intermediate transfer body may be configured by a resin layer such as an aromatic polyether ketone resin (for example, an aromatic polyether ether ketone resin or the like), a polyphenylene sulfide resin (PPS resin), a polyether imide resin (PEI resin), a polyester resin, a polyamide resin, a polycarbonate resin, or the like.

(Configuration of Polyimide-Based Resin Layer)

The polyimide-based resin layer contains, for example, a polyimide-based resin and conductive carbon particles.

If required, the polyimide-based resin layer may contain another known component.

Herein, the polyimide-based resin layer is a layer containing a polyimide-based resin in the largest amount by mass among the resin layer constituent components.

—Polyimide-Based Resin—

The polyimide-based resin represents a resin containing a constituent unit having an imide bond.

Examples of the polyimide-based resin include a polyimide resin, a polyamide-imide resin, a polyether imide resin, and the like.

Among these, from the viewpoint of cleaning maintenability, the polyimide-based resin is preferably a polyimide resin and a polyamide-imide resin, and more preferably a polyimide resin.

The polyimide resin is, for example, an imidized product of polyamic acid (precursor of a polyimide resin) which is a polymer of tetracarboxylic dihydride and diamine compound.

The polyimide resin is, for example, a resin having a constituent unit represented by general formula (I) below.

General Formula (I)

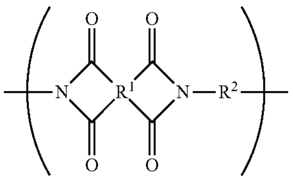

In the general formula (I), $R^1$ represents a tetravalent organic group, and $R^2$ represents a divalent organic group.

Examples of the tetravalent organic group represented by $R^1$ include an aromatic group, an aliphatic group, an alicyclic group, a combined group of an aromatic group and an aliphatic group, and substituted groups thereof. A specific example of the tetravalent organic group is a reside of tetracarboxylic dianhydride described later.

Examples of the divalent organic group represented by $R^2$ include an aromatic group, an aliphatic group, an alicyclic group, a combined group of an aromatic group and an aliphatic group, and substituted groups thereof. A specific example of the divalent organic group is a reside of a diamine compound described later.

Examples of the tetracarboxylic dianhydride used as a raw material of the polyimide resin include pyromellitic dianhydride, 3,3',4,4'-benzophenone tetracarboxylic dianhydride, 3,3',4,4'-biphenyl tetracarboxylic dianhydride, 2,3,3',4-biphenyl tetracarboxylic dianhydride, 2,3,6,7-naphthalene tetracarboxylic dianhydride, 1,2,5,6-naphthalene tetracarboxylic dianhydride, 1,4,5,8-naphthalene tetracarboxylic dianhydride, 2,2'-bis(3,4-dicarboxyphenyl)sulfonic dianhydride, perylene-3,4,9,10-tetracarboxylic dianhydride, bis(3,4-dicarboxyphenyl)ether dianhydride, ethylene tetracarboxylic dianhydride, and the like.

Examples of the diamine compound used as a raw material of the polyimide resin include 4,4'-diaminodiphenyl ether, 4,4'-diaminodiphenylmethane, 3,3'-diaminodiphenylmethane, 3,3'-dichlorobenzidine, 4,4'-diaminodiphenyl sulfide, 3,3'-diaminodiphenyl sulfone, 1,5-diaminonaphthalene, m-phenylenediamine, p-phenylenediamine, 3,3'-dimethyl-4,4'-biphenyldiamine, benzidine, 3,3'-dimethylbenzidine, 3,3'-dimethoxybenzidine, 4,4'-diaminodiphenylsulfone, 4,4'-diaminodiphenylpropane, 2,4-bis(β-amino-tertiary butyl)toluene, bis (p-β-amino-tertiary butylphenyl)ether, bis(p-β-methyl-6-aminophenyl)benzene, bis-p-(1,1-dimethyl-5-amino-pentyl)benzene, 1-isopropyl-2,4-m-phenylenediamine, m-xylylenediamine, p-xylylenediamine, di(p-aminocyclohexyl)methane, hexamethylenediamine, heptamethylenediamine, octamethylenediamine, nonamethylenediamine, decamethylenediamine, diaminopropyl tetramethylene, 3-methylheptamethylenediamine, 4,4-dimethylheptamethylenediamine, 2,11-diaminododecane, 1,2-bis-3-aminopropoxyethane, 2,2-dimethylpropylenediamine, 3-methoxyhexamethylenediamine, 2,5-dimethylheptamethylenediamine, 3-methylheptamethylenediamine, 5-methylnonamethylenediamine, 2,17-diamino-eicosadecane, 1,4-diaminocyclohexane, 1,10-diamino-1,10-dimethyldecane, 12-diaminooctadecane, 2,2-bis[4-(4-aminophenoxy)phenyl]propane, piperazine, $H_2N(CH_2)_3O(CH_2)_2O(CH_2)NH_2$, $H_2N(CH_2)_3S(CH_2)_3NH_2$, $H_2N(CH_2)_3N(CH_3)_2(CH_2)_3NH_2$, and the like.

The polyamide-imide resin is, for example, a resin having an imide bond and an amide bond in a repeating unit.

A more specific example of the polyamide-imide resin is a polymer of a trivalent carboxylic acid compound (also referred to as “tricarboxylic acid”) having an acid anhydride group and a diisocyanate compound or diamine compound.

Preferred examples of the tricarboxylic acid include trimellitic anhydride and derivatives thereof. The tricarboxylic acid may be used in combination with tetracarboxylic dianhydride, aliphatic dicarboxylic acid, aromatic dicarboxylic acid, or the like.

Examples of the diisocyanate compound include 3,3'-dimethylbiphenyl-4,4'-diisocyanate, 2,2'-dimethylbiphenyl-4,4'-diisocyanate, biphenyl-4,4'-diisocyanate, biphenyl-3,3'-diisocyanate, biphenyl-3,4'-diisocyanate, 3,3'-diethylbiphenyl-4,4'-diisocyanate, 2,2'-diethylbiphenyl-4,4'-diisocyanate, 3,3'-dimethoxybiphenyl-4,4'-diisocyanate, 2,2'-dimethoxybiphenyl-4,4'-diisocyanate, naphthalene-1,5-diisocyanate, naphthalene-2,6-diisocyanate, and the like.

The diamine compound is, for example, a compound having the same structure as the isocyanate described above, but having an amino group in place of an isocyanate group.

From the viewpoint of adjusting mechanical strength, volume resistivity, etc., the content of the polyimide-based resin relative to the polyimide-based resin layer is preferably 60% by mass or more and 95% by mass or less, more preferably 70% by mass or more and 95% by mass or less, and still more preferably 75% by mass or more and 90% by mass or less.

—Conductive Carbon Particles—

The conductive carbon particles are, for example, carbon black.

Examples of carbon black include ketjen black, oil furnace black, channel black, acetylene black, and the like. Also, carbon black with treated surfaces (also referred to as “surface-treated carbon black”) may be used as the carbon black.

The surface-treated carbon black can be produced by applying, for example, a carboxyl group, a quinone group, a lactone group, a hydroxyl group, or the like to the surfaces thereof. Examples of a surface treatment method include an air oxidation method of reaction in contact with air in a high-temperature atmosphere, a method of reaction with a nitrogen oxide or ozone at room temperature (for example, 22° C.), a method of oxidation with ozone at a low temperature after air oxidation in a high-temperature atmosphere, and the like.

From the viewpoint of dispersibility, mechanical strength, volume resistivity, film formation properties, etc., the average particle diameter of the conductive carbon particles is preferably 2 nm or more and 40 nm or less, more preferably 6 nm or more and 20 nm or less, and still more preferably 8 nm or more and 15 nm or less.

The average particle diameter of the conductive carbon particles is measured by the following method.

First, a measurement sample having a thickness of 100 nm is obtained from the polyimide-based resin layer by using a microtome, and the measurement sample is observed with TEM (transmission electron microscope). Then, the diameter (that is, the equivalent circle diameter) of a circle equivalent to the projection area of each of 50 conductive carbon particles is determined as a particle diameter, and an average thereof is regarded as the average particle diameter.

From the viewpoint of mechanical strength, volume resistivity, etc., the content of the conductive carbon particles relative to the polyimide-based resin layer is preferably 10% by mass or more and 50% by mass or less.

—Other Component—

Examples of the other components include a conductive agent other than the conductive particles, a filler for improving mechanical strength, an antioxidant for preventing thermal degradation of the belt, a surfactant for improving fluidity, a heat-resistant anti-aging agent, a mold release agent, and the like.

When the other components are contained, the content of the other components relative to the polyimide-based resin layer is preferably over 0% by mass and 10% by mass or less, more preferably over 0% by mass and 5% by mass or less, and still more preferably over 0% by mass and 1% by mass or less.

(Thickness of Polyimide-Based Resin Layer)

When the intermediate transfer body is configured by a single layer of the polyimide-based resin layer, from the viewpoint of mechanical strength, the thickness of the polyimide-based resin layer is preferably 60 μm or more and 120 μm or less and more preferably 80 μm or more and 120 μm or less.

When the intermediate transfer body is configured by a laminate having the polyimide-based resin layer as the outermost surface layer, from the viewpoint of production suitability and suppressing discharge, the thickness of the polyimide-based resin layer is preferably 1 μm or more and 60 μm or less and more preferably 3 μm or more and 60 μm or less.

The thickness of the polyimide-based resin layer is measured as follows.

That is, the thickness of the layer to be measured is measured at 10 positions by observing a section of the polyimide-based resin layer in the thickness direction with an optical microscope or a scanning electron microscope, and an average thereof is regarded as the thickness.

(Recording Medium Transport Body)

A preferred example of the recording medium transport body is a transport body having the same configuration as the intermediate transfer body described above.

[Cleaning blade]

(Configuration)

The cleaning blade may have, for example, a single-layer configuration, a two-layer configuration, a three or more-layer configuration, or another configuration. An example of the cleaning blade having a single-layer configuration is a cleaning blade (that is, a cleaning blade including a contact member) configurated by a single material over the entire region including the contact part with the intermediate transfer body.

An example of the cleaning blade having a two-layer configuration is a cleaning blade provided with a first layer including a contact member containing a contact part with the intermediate transfer body, and a second layer as a back layer formed on the back side of the first layer and made of a material different from that of the contact member.

An example of the cleaning blade having a three or more-layer configuration is a cleaning blade having another layer, for example, provided between the first and the second layer of the cleaning blade having a two-layer configuration described above.

The cleaning blade is used by, for example, being supported by a rigid plate-shaped supporting material.

(Contact Part in Contact with Intermediate Transfer Body)

In the cleaning blade, the contact part in contact with the intermediate transfer body is often configured by a polyurethane rubber member.

Polyurethane rubber is a polyurethane rubber produced by polymerizing at least a polyol component and a polyisocyanate component. If required, the polyurethane rubber may be polyurethane rubber produced by polymerizing, other than the polyol component, a resin having a functional group reactable with an isocyanate group of polyisocyanate.

[First Transfer Device]

In the first transfer device, the first transfer member is disposed to face the image holding member with the intermediate transfer body disposed therebetween. In the first transfer device, when a voltage with polarity opposite to the charging polarity of a toner is applied to the intermediate transfer body from the first transfer member, a toner image is first transferred to the outer peripheral surface of the intermediate transfer body.

The transfer member of the direct transfer-system transfer device has, for example, the same configuration as the first transfer member of the first transfer device.

[Second Transfer Device]

In the second transfer device, the second transfer member is disposed on the toner image holding side of the intermediate transfer body, and the second transfer device includes, for example, together with the second transfer member, a back member disposed on the side opposite to the toner image holding side of the intermediate transfer body. In the second transfer device, when the intermediate transfer body and the recording medium are held between the second transfer member and the back member to form a transfer electric field, the toner image on the intermediate transfer body is second transferred to the recording medium.

The second transfer member may be either a second transfer roller or a second transfer belt. For example, a back roller is applied to the back member.

[Other Configuration of Transfer Device]

The transfer device according to the exemplary embodiment may be a transfer device which transfers the toner image to the surface of the recording medium through plural intermediate transfer bodies. That is, the transfer device may be, for example, a transfer device in which the toner image is first transferred to a first intermediate transfer body from the image holding member, further the toner image is second transferred to a second intermediate transfer body from the first intermediate transfer body, and then the toner image is third transferred to the recording medium from the second intermediate transfer body.

[Image Forming Apparatus]

The image forming apparatus according to the exemplary embodiment includes a toner image forming device which has an image holding member and forms a toner image on the surface of the image holding member, and a transfer device which transfers the toner image formed on the surface of the image holding member to the surface of a recording medium and which is the transfer device according to the exemplary embodiment exemplary described above.

An example of the toner image forming device includes, for example, an image holding member, a charging device which charges the surface of the image holding member, an electrostatic latent image forming device which forms an electrostatic latent image on the charged surface of the image holding member, and a developing device which develops the electrostatic latent image formed on the surface of the image holding member with a developer containing a toner to form a toner image.

Examples of an image forming apparatus applied to the image forming apparatus according to the exemplary embodiment include known ones, such as an apparatus including a fixing unit which fixes a toner image transferred to the surface of a recording medium, an apparatus including a cleaning device which cleans the surface of the image holding member after transfer of the toner image and before charging, an apparatus including an elimination device which eliminates electricity by irradiating the surface of the image holding member with static elimination light after transfer of the toner image and before charging, an apparatus including an image holding member heating member which increases the temperature of the image holding member and decreases the relative temperature, and the like.

The image forming apparatus according to the exemplary embodiment may be either a dry development-system image forming apparatus or a wet development-system (development system using a liquid developer) image forming apparatus.

In the image forming apparatus according to the exemplary embodiment, for example, a part provided with the image holding member may have a cartridge structure (process cartridge) detachable from the image forming apparatus. For example, a process cartridge including a toner image forming device and a transfer device is preferably used as the process cartridge.

Examples of the image forming apparatus according to the exemplary embodiment are described below with reference to the drawings. However, the image forming apparatus according to the exemplary embodiment is not limited to these. In addition, principal parts shown in the drawings are described, and description of other parts is omitted.

(Image Forming Apparatus)

First Exemplary Embodiment

FIG. 1 is a schematic configuration diagram showing an example of an image forming apparatus according to a first exemplary embodiment.

As shown in FIG. 1, an image forming apparatus 100 according the first exemplary embodiment is, for example, an intermediate transfer-system image forming apparatus generally called a "tandem type", and includes plural image forming units 1Y, 1M, 1C, and 1K which form toner images of respective color components by an electrophotographic system, first transfer parts 10 which sequentially transfer (first transfer) the toner images of the respective color components formed by the image forming units 1Y, 1M, 1C, and 1K to an intermediate transfer belt 15, a second transfer part 20 which collectively transfers (second transfer) the superposed toner images transferred to the intermediate transfer belt 15 to paper K serving as a recording medium, and a fixing device 60 which fixes the second transferred images to the paper K. Also, the image forming apparatus 100 includes a controller 40 which controls the operation of each of the devices (parts).

Each of the image forming units 1Y, 1M, 1C, and 1K of the image forming apparatus 100 includes which holds the toner image formed on the surface thereof, a photoreceptor 11 (an example of the image holding member) which is rotated in the direction of arrow A.

A charging unit 12 which charges the photoreceptor 11 is provided, as an example of the charging device, around the photoreceptor 11, and a laser exposure unit 13 (in the drawing, an exposure beam is denoted by reference numeral Bm) which writes an electrostatic latent image on the photoreceptor 11 is provided, as an example of the electrostatic latent image forming device, above the photoreceptor 11.

In addition, there are provided around the photoreceptor 11 a developing unit 14 as an example of the developing device which houses a toner of each of the color components and visualizes the electrostatic latent image on the photoreceptor 11 with the toner, and in the first transfer part 10, a first transfer roller 16 which transfers the toner image of each of the color components formed on the photoreceptor 11 to the intermediate transfer belt 15.

Further, there is provided around the photoreceptor 11 a photoreceptor cleaner 17 which removes the toner remaining on the photoreceptor 11, and electrophotographic devices such as the charging unit 12, the laser exposure unit 13, the developing unit 14, the first transfer roller 16, and the photoreceptor cleaner 17 are disposed in order along the rotational direction of the photoreceptor 11. The image forming units 1Y, 1M, 1C, and 1K are substantially linearly disposed in the order of yellow (Y), magenta (M), cyan (C), and black (K) from the upstream side of the intermediate transfer belt 15.

The intermediate transfer belt 15 is circularly driven (rotated) by various rollers at a speed matched with a purpose in direction B shown in FIG. 1. The various rollers include a drive roller 31 which is driven by a motor (not shown) having an excellent constant speed property to rotate the intermediate transfer belt 15, a support roller 32 which supports the intermediate transfer belt 15 extending substantially linearly along the arrangement direction of the photoreceptors 11, a tension-applying roller 33 functioning as a correction roller which applies tension to the intermediate transfer belt 15 and prevents meandering of the intermediate transfer belt 15, a back roller 25 provided in the second transfer part 20, and a cleaning back roller 34 provided to face an intermediate transfer belt cleaning blade 35 which scrapes the toner remaining on the intermediate transfer belt 15.

Each of the first transfer parts 10 includes a first transfer roller 16 disposed to face the photoreceptor 11 with the intermediate transfer belt 15 disposed therebetween. The first transfer roller 16 is disposed in pressure contact with the photoreceptor 11 with the intermediate transfer belt 15 disposed therebetween, and further a voltage (first transfer bias) with polarity opposite to the charging polarity (minus polarity, this also applies below) of the toner is applied to the first transfer roller 16. Therefore, the toner images on the photoreceptors 11 are sequentially electrostatically attracted to the intermediate transfer belt 15, thereby forming superposed toner images on the intermediate transfer belt 15.

The second transfer part 20 is configured to include the back roller 25 and the second transfer roller 22 disposed on the toner image holding surface side of the intermediate transfer belt 15.

The back roller 25 is formed to have a surface resistivity of $1\times10^{7}$ Ω/□ or more and $1\times10^{10}$ Ω/□ or less, and the hardness is set to, for example, 70° (Asker C, manufactured by Kobunshi Keiki Co., Ltd., this also applies below). The back roller 25 is disposed on the back surface side of the intermediate transfer belt 15 to configure a counter electrode of the second transfer roller 22, and a metal-made power supply roller 26, to which the second transfer bias is stably applied, is disposed in contact with the back roller 25.

On the other hand, the second transfer roller 22 is a cylindrical roller having a volume resistivity of $10^{7.5}$ Ωcm or more and $10^{8.5}$ Ωcm or less. The second transfer roller 22 is disposed in pressure contact with the back roller 25 with the intermediate transfer belt 15 disposed therebetween, and further the second transfer roller 22 is earthed to form a second transfer bias between the second transfer roller 22 and the back roller 25 so that the toner image is second transferred to the paper K transported to the second transfer part 20.

Further, the intermediate transfer belt cleaning blade 35 which after second transfer, removes the remaining toner and paper dust on the intermediate transfer belt 15 and cleans the surface of the intermediate transfer belt 15 is detachably provided on the intermediate transfer belt 15 downstream the second transfer part 20.

In addition, an inorganic compound particle supply member 36 which supplies the inorganic compound particles to the contact part between the intermediate transfer belt 15 and the intermediate transfer belt cleaning blade 35 is provided upstream the first transfer parts 10 of the first transfer rollers 16 and downstream the cleaning blade 35.

The intermediate transfer belt 15, the first transfer rollers 16, the second transfer roller 22, the intermediate transfer belt cleaning blade 35, and the inorganic compound particle supply member 36 correspond to an example of the transfer device.

Herein, the image forming apparatus 100 may have a configuration provided with a second transfer belt (an example of the second transfer member) in place of the second transfer roller 22.

On the other hand, a reference sensor (home position sensor) 42 which generates a reference signal serving as a reference for image formation timing in each of the image forming units 1Y, 1M, 1C, and 1K is disposed upstream the image forming unit 1Y of yellow. Also, an image density sensor 43 for adjusting image quality is disposed downstream the black image forming unit 1K. The reference sensor 42 is configured to recognize a mark provided on the back surface of the intermediate transfer belt 15 and generate a reference signal so that each of the image forming units 1Y, 1M, 1C, and 1K starts image formation by instruction from the controller 40 based on the recognition of the reference signal.

Further, the image forming apparatus according to the exemplary embodiment includes, as a transport unit which transports the paper K, a paper housing part 50 which houses the paper K, a paper feed roller 51 which takes out and transports the paper K accumulated in the paper housing part 50 with predetermined timing, transport rollers 52 which transport the paper K delivered by the paper feed roller 51, a transport guide 53 which sends the paper K transported by the transport rollers 52 to the second transfer part 20, a transport belt 55 which transports, to the fixing device 60, the paper K transported after second transfer by the second transfer roller 22, and a fixing inlet guide 56 which guides the paper K to the fixing device 60.

Next, the fundamental image formation processes of the image forming apparatus according to the first exemplary embodiment are described.

In the image forming apparatus according to the first exemplary embodiment, image data output from an image reading device (not shown), a personal computer PC (not shown), or the like is subjected to image processing by an image processing device (not shown), and then an image forming work is executed by the image forming units 1Y, 1M, 1C, and 1K.

In the image processing device, the input reflectance data is subjected to image processing such as shading correction, misregistration correction, brightness/color space conversion, gamma correction, frame release, and various image editing such as color editing, movement editing, and the like. The image data subjected to image processing is converted to color material tone data of the four colors of Y, M, C, and K and then output to the laser exposure unit 13.

In the laser exposure unit 13, the photoreceptor 11 of each of the image forming units 1Y, 1M, 1C, and 1K is irradiated with the exposure beam Bm emitted from, for example, a semiconductor laser, according to the input color material tone data. After the photoreceptor 11 of each of the image forming units 1Y, 1M, 1C, and 1*k* is charged by the charging unit 12, the surface thereof is scanned and exposed to light by the laser exposure unit 13 to form an electrostatic latent image. The formed electrostatic latent image is developed as a toner image of each of Y, M, C, and K colors by the image forming units 1Y, 1M, 1C, and 1K, respectively.

The toner image formed on the photoreceptor 11 of each of the image forming units 1Y, 1M, 1C, and 1K is transferred to the intermediate transfer belt 15 at the first transfer part 10 in which the photoreceptor 11 is in contact with the intermediate transfer belt 15. More specifically, in the first transfer part 10, a voltage (first transfer bias) with polarity opposite to the charging polarity (minus polarity) of the toner is applied to the substrate of the intermediate transfer belt 15 by the first transfer roller 16, and the toner images are first transferred to be sequentially superposed on the outer peripheral surface of the intermediate transfer belt 15.

After the toner images are sequentially first transferred to the outer peripheral surface of the intermediate transfer belt 15, the intermediate transfer belt 15 is moved, and the toner images are transported to the second transfer part 20. When the toner images are transported to the second transfer part 20, in the transport unit, the paper feed roller 51 is rotated in coincidence with transport timing of the toner images to the second transfer part 20, and the paper K of the intended size is supplied from the paper housing part 50. The paper K supplied by the paper feed roller 51 is transported by the transport rollers 52 and reaches the second transfer part 20 through the transport guide 53. The paper K is once stopped before reaching the second transfer part 20, and a position alignment roller (not shown) is rotated in coincidence with the timing of movement of the intermediate transfer belt 15 holding the toner images, thereby aligning the position of the paper K with the position of the toner images.

In the second transfer part 20, the second transfer roller 22 is pressed by the back roller 25 through the intermediate transfer belt 15. At this time, the paper K transported in coincidence with timing is held between the intermediate transfer belt 15 and the second transfer roller 22. In this case, a voltage (second transfer bias) with the same polarity as the charging polarity (minus polarity) of the toner is applied from the power supply roller 26, and thus a transfer electric field is formed between the second transfer roller 22 and the back roller 25. Then, the unfixed toner images held on the intermediate transfer belt 15 are collectively electrostatically transferred to the paper K in the second transfer part 20 pressurized by the second transfer roller 22 and the back roller 25.

Then, the paper K, to which the toner images have been electrostatically transferred, is peeled off from the intermediate transfer belt 15 by the second transfer roller 22, and in this state, the paper K is transported as it is to the transport belt 55 provided downstream the second transport roller 22 in the paper transport direction. In the transport belt 55, the paper K is transported to the fixing device 60 in accordance with the optimum transport speed in the fixing device 60. The unfixed toner images on the paper K transported to the fixing device 60 are fixed to the paper K by fixing treatment with heat and pressure in the fixing device 60. The paper K having the fixed image formed thereon is transported to an ejected paper housing part (not shown) provided in the discharge part of the image forming apparatus.

On the other hand, the residual toner remaining on the intermediate transfer belt 15 after the completion of transfer to the paper K is transported to the intermediate transfer belt cleaning blade 35 in association with the rotation of the intermediate transfer belt 15 and removed from the intermediate transfer belt 15 by the intermediate transfer belt cleaning blade 35. Then, the inorganic compound particle supply member 36 is abraded by sliding with the intermediate transfer belt 15 in association with rotation of the intermediate transfer belt 15, and thus the inorganic compound particles are supplied to the contact part between the intermediate transfer belt 15 and the intermediate transfer belt cleaning blade 35, thereby improving the cleaning property of the intermediate transfer belt cleaning blade 35.

The first exemplary embodiment is described above, but various modifications, changes, and improvements can be made.

Second Exemplary Embodiment

Figure 2:
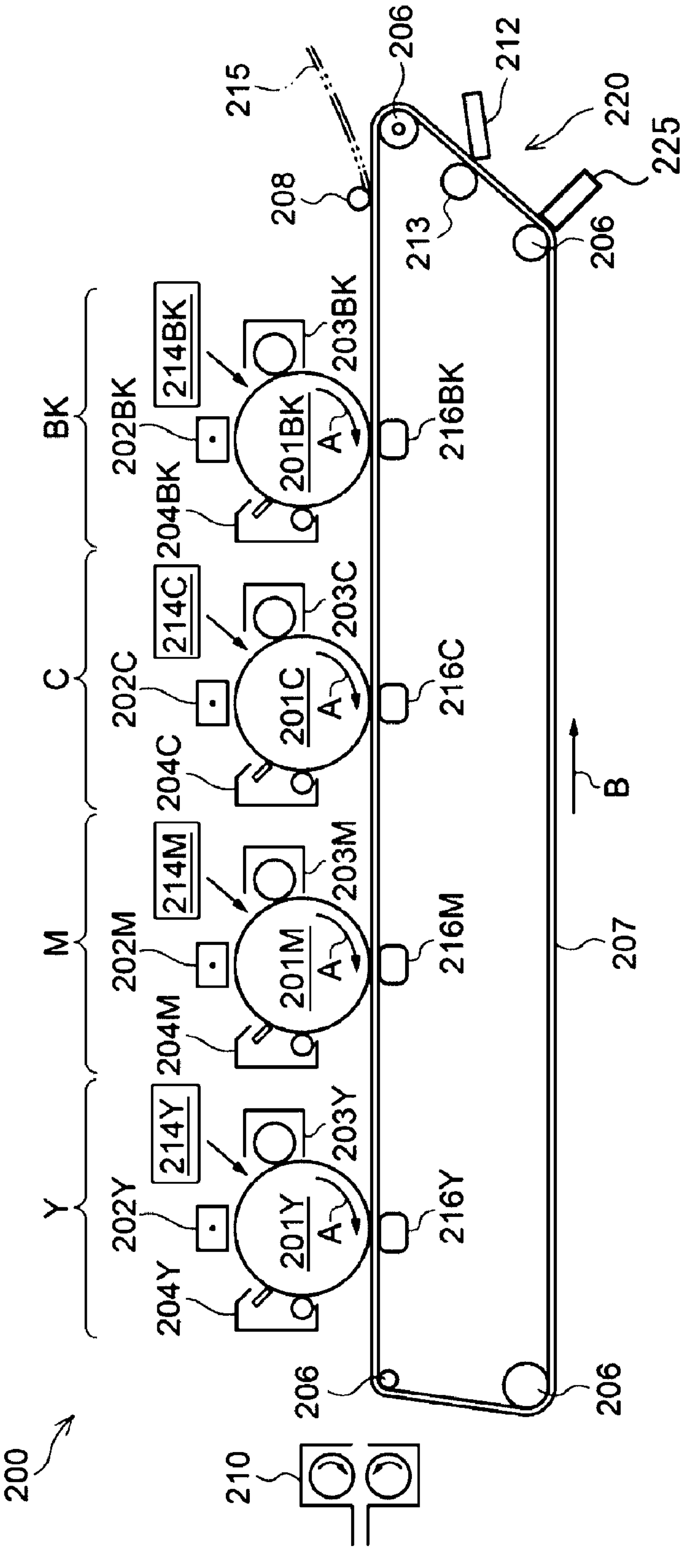
FIG. 2 is a schematic configuration diagram showing an example of an image forming apparatus according to a second exemplary embodiment.

FIG. 2 is a schematic configuration diagram showing an example of an image forming apparatus according to a second exemplary embodiment of the present disclosure.

As shown in FIG. 2, in an image forming apparatus 200 according to the second exemplary embodiment, units Y, M, C, and BK are provided with photoreceptors 201Y, 201M, 201C, and 201BK (an example of the image holding member), respectively, so that they are rotated in the clockwise direction of arrow A. There are disposed around the photoreceptors 201Y, 201M, 201C, and 201BK, charging units 202Y, 202M, 202C, and 202BK (an example of the charging derive), exposure units 214Y, 214M, 214C, and 214BK (an example of the electrostatic latent image forming device), color developing devices (a yellow developing device 203Y, a magenta developing device 203M, a cyan developing device 203C, and a black developing device 203BK) (an example of the developing device), and photoreceptor cleaning members 204Y, 204M, 204C, and 204BK, respectively.

In addition, a specific toner is housed in at least one of the color developing devices. In the second exemplary embodiment, specific toners are preferably housed in all color developing devices.

The four units Y, M, C, and BK are arranged in parallel with a paper transport belt 207 (an example of the recording medium transport body) in the order of the units BK, C, M, and Y. However, the order, such as the order of the units BK, C, M, and Y, is property set according to the image forming method.

The paper transport belt 207 is supported on the inner surface side by four belt support rollers 206, forming a paper transport belt unit. The paper transport belt 207 is adjusted to be rotated in the counterclockwise direction of arrow B at the same peripheral speed as the photoreceptors 201Y, 201M, 201C, and 201BK, and are arranged so that portions thereof located between the belt support rollers 206 are in contact with the respective photoreceptors 201Y, 201M, 201C, and 201BK.

Further, transfer members 216Y, 216M, 216C, and 216BK (an example of the transfer member) are provided at the respective transfer positions where the color component toner images formed by the respective photoreceptors 201Y, 201M, 201C, and 201BK are transferred to paper 215 (an example of the recording medium) transported by the paper transport belt 207.

The transfer members 216Y, 216M, 216C, and 216BK form the respective transfer regions where the toner images are transferred to the paper 215 through the photoreceptors 201Y, 201M, 201C, and 201BK and the paper transport belt 207.

In addition, a cleaning blade 212 is disposed on the paper transport belt 207 so as to be in contact with the paper transport surface side (outer peripheral surface). Also, a cleaning counter roller 213 is disposed as a conductive counter member on the side opposite to the cleaning blade 212 so as to be in contact therewith through the paper transport belt 207, forming a paper transport belt cleaning device 220.

The paper transport belt cleaning device 220 may also be provided with brush cleaning, roll cleaning, scraper cleaning, or the like in addition to the cleaning blade 212.

In addition, an inorganic compound particle supply member 225 which supplies inorganic compound particles is provided in the contact part between the paper transfer belt 207 and the cleaning blade 212 on the downstream side of the transfer members 216Y, 216M, 216C, and 216BK and on the upstream side of the cleaning blade 212.

The transfer members 216Y, 216M, 216C, and 216BK, the paper transport belt 207, the cleaning blade 212, and the inorganic compound particle supply member 225 correspond to an example of the transfer device.

A fixing device 210 (an example of the fixing device) is disposed so that paper is transported after being passed through the transfer region between the paper transport belt 207 and each of the photoreceptors 201Y, 201M, 201C, and 201BK.

The paper 215 is transported to the paper transport belt 207 by a paper transport roller 208.

In the image forming apparatus shown in FIG. 2, the photoreceptor 201BK in the unit BK is rotationally driven. In conjugation with this, the charging unit 202BK is driven to charge the surface of the photoreceptor 201BK to the intended polarity and potential. Next, the photoreceptor 201BK with the charged surface is image-wise exposed to light by the exposure unit 214BK, forming an electrostatic latent image on the surface.

Then, the electrostatic latent image is developed by the black developing device 203BK. Thus, a toner image is formed on the surface of the photoreceptor 201BK. In this case, the developer may be a one-component system or a two-component system.

When the paper 215 is passed through a nip N formed in the transfer region between the photoreceptor 201BK and the paper transport belt 207, and is electrostatically attracted to the paper transport belt 207 and transported to the transfer region, the toner image is sequentially transferred to the surface of the paper 215 by an electric field formed by the transfer bias applied from the transfer member 216BK.

Then, the toner remaining on the photoreceptor 201BK is cleaned and removed by the photoreceptor cleaning member 204BK. Then, the photoreceptor 201BK is subjected to next image transfer.

The image transfer is also performed in the units C, M, and Y by the same method as described above.

The paper 215 to which the toner images have been transferred by the transfer members 216BK, 216C, 216M, and 216Y is further transported to the fixing device 210 and fixed.

After transfer, the residual toner is removed from the photoreceptors 201Y, 201M, 201C, and 201BK by the photoreceptor cleaning members 204Y, 204M, 204C, and 204BK, respectively. On the other hand, after transport of the recording medium 215, the residual toner is removed from the paper transport belt 207 by the cleaning blade 212 in the paper transport belt cleaning device 220, and the paper transport belt 207 is prepared for a next image forming process. In addition, the inorganic compound particle supply member 225 is abraded by sliding with the paper transport belt 207 in association with rotation of the paper transport belt 207, and the inorganic compound particles are supplied to the contact part between the paper transport belt 207 and the cleaning blade 212, thereby improving the cleaning property of the cleaning blade 212.

Thus, an image is formed on the paper.

The image forming apparatus according to the second exemplary embodiment is described above, but various modifications, changes, and improvements can be made.

An example of the configurations of the image forming apparatuses according to the first and second exemplary embodiments may be a usual mono-color image forming apparatus in which only a mono-color toner is housed in a developing device.

EXAMPLES

Examples of the present disclosure are described below, but the present disclosure is not limited to these examples. In description below, "parts" and "%" are all on mass basis unless otherwise specified.

<Formation of Inorganic Compound Particle Supply Member>

(Inorganic Compound Particle Supply Member (1))

Polycaprolactone polyol (manufactured by Daicel Corporation, Placcel 205, average molecular weight: 529, hydroxyl value: 212 KOHmg/g) and polycaprolactone polyol (manufactured by Daicel Corporation, Placcel 240, average molecular weight: 4155, hydroxyl value: 27 KOHmg/g) are used as hard segment materials of a polyol component. Also, an acrylic resin (manufactured by Soken Chemical Co., Ltd., Actoflow UMB-2005B) having two or more hydroxyl groups is used as a soft segment material. Then, silica particles are mixed with a mixture of the hard segment materials and the soft segment material at 8:2 (mass ratio). Next, 6.26 parts by mass of 4,4'-diphenylmethane diisocyanate (manufactured by Nippon Polyurethane Industry Co., Ltd., Millionate MT) is added as an isocyanate compound to 100 parts by mass of the mixture of the silica particles, the hard segment materials, and the soft segment material, and reacted at 70° C. for 3 hours in a nitrogen atmosphere. The amount of the isocyanate compound used in the reaction is selected so that the ratio (isocyanate group/hydroxyl group) of isocyanate group to hydroxyl group contained in the reaction system is 0.5.

Then, 34.3 parts by mass of the isocyanate compound is further added and reacted at 70° C. for 3 hours in a nitrogen atmosphere, producing a prepolymer. The total amount of the isocyanate compound used for producing the prepolymer is 40.56 parts by mass.

Next, the prepolymer is heated to 100° C. and defoamed for 1 hour under reduced pressure. Then, a crosslinking agent (trimethylolpropane) and a catalyst (DBU) are added to the prepolymer and mixed for 3 minutes so as not to mix in bubbles, and the resultant mixture is poured into a mold to form an inorganic compound particle supply member. The amount of the crosslinking agent added is 0.7 mol %, and the mount of the catalyst added is 0.01% by mass.

An inorganic compound particle supply member (1) is produced by the operation described above.

The silica particles used are silica particles shown in Table 1, and the amount of the silica particles added is shown in "Inorganic compound particle—content" in Table 1.

(Inorganic Compound Particle Supply Members (2) to (5))

Inorganic compound particle supply members (2) to (5) are formed by the same method as for the inorganic compound particle supply member (1) except that the type and content (content relative to the member) of silica particles are changed according to Table 1.

(Inorganic Compound Particle Supply Member (6))

An inorganic compound particle supply member (6) is formed by the same method as for the inorganic compound particle supply member (1) except that the prepolymer is heated to 120° C., and the amount of crosslinking agent added is 1.0 mol %.

(Inorganic Compound Particle Supply Members (7) and (8))

Inorganic compound particle supply members (7) and (8) are formed by the same method as for the inorganic compound particle supply member (1) except that the type and content (content relative to the member) of inorganic compound particles used in place of silica particles are changed according to Table 1.

(Inorganic Compound Particle Supply Members (9) and (10))

Inorganic compound particle supply members (9) and (10) are formed by the same method as for the inorganic compound particle supply member (1) except that the type and content (content relative to the member) of silica particles are changed according to Table 1.

(Inorganic Compound Particle Supply Member (11))

An inorganic compound particle supply member (11) is formed by the same method as for the inorganic compound particle supply member (7) except that a treatment layer of 1 μm is formed on the surface of the member, produced by pouring into a mold, by tetrahedral amorphous coating which can be performed by a filtered cathode vacuum arc (FCVA) method in which using a FCVA apparatus manufactured by Shimadzu Corporation, carbon plasma is generated by vacuum arc discharge of graphite, and ionized carbon is extracted and deposited.

(Inorganic Compound Particle Supply Member (12))

An inorganic compound particle supply member (12) is formed by the same method as for the inorganic compound particle supply member (8) except that a treatment layer of 1 μm is formed on the surface of the member, produced by pouring into a mold, by tetrahedral amorphous coating which can be performed by a filtered cathode vacuum arc (FCVA) method in which using a FCVA apparatus manufactured by Shimadzu Corporation, carbon plasma is generated by vacuum arc discharge of graphite, and ionized carbon is extracted and deposited.

(Inorganic Compound Particle Supply Member (13))

An inorganic compound particle supply member (13) is formed by the same method as for the inorganic compound particle supply member (1) except that a treatment layer of 0.1 μm is formed on the surface of the member, produced by pouring into a mold, by tetrahedral amorphous coating which can be performed by a filtered cathode vacuum arc (FCVA) method in which using a FCVA apparatus manufactured by Shimadzu Corporation, carbon plasma is generated by vacuum arc discharge of graphite, and ionized carbon is extracted and deposited.

(Inorganic Compound Particle Supply Member (C1))

An inorganic compound particle supply member (C1) is formed by the same method as for the inorganic compound particle supply member (1) except that a treatment layer of 10 μm is formed on the surface of the member, produced by pouring into a mold, by tetrahedral amorphous coating which can be performed by a filtered cathode vacuum arc (FCVA) method in which using a FCVA apparatus manufactured by Shimadzu Corporation, carbon plasma is generated by vacuum arc discharge of graphite, and ionized carbon is extracted and deposited.

Examples 1 to 13 and Comparative Example 1

An image forming apparatus "Apeosport-VI C7771 manufactured by Fujifilm Business Innovation Corp." is modified by mounting an inorganic compound particle supply member according to Table 1.

The inorganic compound particle supply member is mounted so as to be in contact with the intermediate transfer belt on the upstream side of the first transfer part in the rotational direction of the intermediate transfer belt and on the downstream side of the intermediate transfer belt cleaning blade in the rotational direction of the intermediate transfer belt.

In addition, the pressing force of the inorganic compound particle supply member to the intermediate transfer belt is 2 gf/mm. Thus, the inorganic compound particle supply member is abraded by sliding with the intermediate transfer belt in association with rotation of the intermediate transfer belt so that the inorganic compound particles are supplied to the contact part between the intermediate transfer belt and the intermediate transfer belt cleaning blade.

The Young's modulus of the outer peripheral surface of the intermediate transfer belt of the image forming apparatus is 3500 MPa.

Evaluation below is performed by using the image forming apparatus.

<Toner Adhesive Force (Described as "TN Adhesive Force")>

An image is formed by the same method as in evaluation of "Transferability to embossed paper" using the image forming apparatus of each of the examples.

Then, the intermediate transfer belt is taken out from the image forming apparatus and evaluated as follows.

In a state where a voltage of 10 kV is applied horizontally with the belt, polyester resin particles are scattered from above the belt and adhered in a loading amount of 3 $g/cm^2$.

In this case, the polyester resin particles are composed of a polycondensate of dimethyl fumarate as a dicarboxylic acid and propylene glycol as a dialcohol, and resin particles having a weight-average molecular weight of 25000 and a volume-average particle diameter of 4.7 μm are applied.

Next, air blowing at a blowing pressure of 0.1 kPa is started on a central portion of the polyester resin particle-adhered surface of the belt from an air outlet having a diameter of 0.7 mm and located above at a height of 3 cm, and the blowing pressure is increased at 0.5 kPa/second.

The pressure when all polyester resin particles are separated from the belt is regarded as "TN adhesive force (over time)".

Also, similarly, TN adhesive force (initial) of the intermediate transfer belt before image formation is examined.

<Transferability to Embossed Paper (Described as "Embossed Paper Transferability")—Initial>

A blue color solid image is formed on embossed paper (Leathac 66, 204 gsm) by using the image forming apparatus of each of the examples in an environment at a temperature of 22° C. and a humidity of 55% RH under the condition in which the transport speed of a recording medium in a second transfer region is 366 mm/s. Then, void in a recessed portion is visually evaluated. The evaluation criteria are as described below, and the results are shown in Table 1.

A toner having a volume-average particle diameter of 4.7 μm is used.

—Evaluation Criteria—

A: No void occurs.
B: Slight color variation occurs.
C: Clear color variation occurs.
D: Void occurs.

<Transferability to Embossed Paper (Described as "Embossed Paper Transferability")—Over Time>

Evaluation is performed by the same method as in "Transferability to embossed paper—initial" except that printing is continuously performed on 10,000 sheets of A4 paper.

<Surface Flaw of Intermediate Transfer Belt>

An image is formed by the same method as in evaluation of "Transferability to embossed paper" using the image forming apparatus of each of the examples.

Then, the intermediate transfer belt is taken out from the image forming apparatus and evaluated as follows.

A square region of 100 μm×100 μm of the belt surface is observed by using a laser microscope, and when a flaw of 0.1 μm or more in width and 1 μm in length is present in the rotational direction of the belt, the depth is measured.

Thus, the surface flaw of the intermediate transfer belt over time is evaluated according to the following criteria.

A: No flaw occurs.

B: A flaw of 0.1 μm or less in width and 1 μm or less in length occurs.

C: A flaw of 0.1 μm or more in width or 1 μm or more in length occurs, and the depth is 0.3 μm or less.

D: A flaw of 0.3 μm or more in depth occurs.

TABLE 1

| | | Example 1 | Example 2 | Example 3 | Example 4 | Example 5 | Example 6 | Example 7 |
|---|---|---|---|---|---|---|---|---|
| Young's modulus of intermediate transfer belt A (MPa) | | 3500 | 3500 | 3500 | 3500 | 3500 | 3500 | 3500 |
| Inorganic compound supply member | Type | (1) | (2) | (3) | (4) | (5) | (6) | (7) |
| | Young's modulus B (MPa) | 10 | 10 | 10 | 10 | 10 | 350 | 10 |
| Young's modulus ratio (B/A) | | 0.002857143 | 0.0028571 | 0.0028571 | 0.002857143 | 0.002857143 | 0.1 | 0.00285714 |
| Inorganic compound particle | Number-average particle diameter (μm) | 0.05 | 0.037 | 0.037 | 0.05 | 0.05 | 0.05 | 0.2 |
| | Aspect ratio | 1.1 | 2 | 2 | 1.1 | 1.1 | 1.1 | 5 |
| | Specific gravity | 2.2 | 2.2 | 3 | 2.2 | 2.2 | 2.2 | 2.2 |
| | Content (% by mass) | 60 | 60 | 60 | 70 | 10 | 60 | 60 |
| | Type | SiO2 | SiO2 | SiO2 | SiO2 | SiO2 | SiO2 | Boron nitride |
| TN adhesive force (kPa) | Initial | 12 | 12 | 12 | 12 | 12 | 12 | 14 |
| | Over time | 12 | 14 | 12 | 12 | 15 | 14 | 16 |
| Embossed paper transferability | Initial | A | A | A | A | A | A | B |
| | Over time | A | B | A | A | C | B | C |
| Surface flaw of intermediate transfer belt | Over time | A | A | B | B | A | C | C |

| | | Example 8 | Example 9 | Example 10 | Example 11 | Example 12 | Example 13 | Comparative Example 1 |
|---|---|---|---|---|---|---|---|---|
| Young's modulus of intermediate transfer belt A (MPa) | | 3500 | 3500 | 3500 | 3500 | 3500 | 3500 | 3500 |
| Inorganic compound supply member | Type | (8) | (9) | (10) | (11) | (12) | (13) | (C1) |
| | Young's modulus B (MPa) | 10 | 10 | 10 | 1600 | 1600 | 500 | 4000 |
| Young's modulus ratio (B/A) | | 0.002857143 | 0.0028571 | 0.0028571 | 0.457142857 | 0.457142857 | 0.14285714 | 1.14285714 |
| Inorganic compound particle | Number-average particle diameter (μm) | 0.1 | 0.05 | 0.05 | 0.2 | 0.1 | 0.05 | 0.05 |
| | Aspect ratio | 2 | 1.1 | 1.1 | 5 | 2 | 1.1 | 1.1 |
| | Specific gravity | 10 | 2.2 | 2.2 | 2.2 | 10 | 2.2 | 2.2 |
| | Content (% by mass) | 60 | 5 | 80 | 60 | 60 | 60 | 60 |
| | Type | Tungsten disulfide | SiO2 | SiO2 | Boron nitride | Tungsten disulfide | SiO2 | SiO2 |
| TN adhesive force (kPa) | Initial | 14 | 12 | 12 | 14 | 14 | 12 | 20 |
| | Over time | 16 | 16 | 12 | 16 | 16 | 12 | 20 |
| Embossed paper transferability | Initial | B | A | A | C | C | B | D |
| | Over time | C | C | A | C | C | C | D |
| Surface flaw of intermediate transfer belt | Over time | C | C | C | C | C | C | D |

It is found that in the examples, the inorganic compound particles are supplied from the inorganic compound particle supply member to the contact part between the intermediate transfer belt and the intermediate transfer belt cleaning blade by abrasion of the inorganic compound particle supply member due to sliding between the intermediate transfer belt and the inorganic compound particle supply member in association with rotation of the intermediate transfer belt, and thus an increase in adhesive force of the toner is suppressed, and a decrease in transferability to the embossed paper is suppressed as compared with in the comparative example.

It is also found that in the examples, the occurrence of surface flaw of the intermediate transfer belt is suppressed as compared with in the comparative example.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

Preferred configurations of the present disclosure are added below.

Appendix (((1)))

An inorganic compound particle supply member containing inorganic compound particles and having a Young's modulus lower than that of a supply object to be supplied with the inorganic compound particles.

(((2)))

The inorganic compound particle supply member described in (((1))), wherein the inorganic compound particles are spherical inorganic compound particles.

(((3)))

The inorganic compound particle supply member described in (((2))), wherein the aspect ratio of the spherical inorganic compound particles is 2 or less.

(((4)))

The inorganic compound particle supply member described in any one of the items (((1))) to (((3))), wherein the specific gravity of the inorganic compound particles is 3.0 or less.

(((5)))

The inorganic compound particle supply member described in any one of the items (((1))) to (((4))), wherein the inorganic compound particles are silica particles.

(((6)))

The inorganic compound particle supply member described in any one of the items (((1))) to (((5))), wherein the content of the inorganic compound particles relative to the inorganic compound particle supply member is 10% by mass or more and 70% by mass or less.

(((7)))

The inorganic compound particle supply member described in any one of the items (((1))) to (((6))), wherein the ratio (Young's modulus of the inorganic compound particle supply member/Young's modulus of the supply object) of the Young's modulus of the inorganic compound particle supply member to the Young's modulus of the supply object is 0.1 or less.

(((8)))

The inorganic compound particle supply member described in any one of the items (((1))) to (((7))), wherein the Young's modulus of the inorganic compound particle supply member is 1500 Mpa or less.

(((9)))

The inorganic compound particle supply member described in any one of the items (((1))) to (((8))), wherein the inorganic compound particles are spherical silica particles.

(((10)))

The inorganic compound particle supply member described in any one of the items (((1))) to (((9))), wherein the content of the inorganic compound particles relative to the inorganic compound particle supply member is 10% by mass or more and 70% by mass or less, and the ratio (Young's modulus of the inorganic compound particle supply member/Young's modulus of the supply object) of the Young's modulus of the inorganic compound particle supply member to the Young's modulus of the supply object is 0.1 or less.

(((11)))

The inorganic compound particle supply member described in (((10))), wherein the Young's modulus of the inorganic compound particle supply member is 1500 Mpa or less.

(((12)))

A transfer device including an intermediate transfer body to whose outer peripheral surface a toner image is transferred, a first transfer device having a first transfer member which first transfers the toner image formed on the surface of an image holding member to the outer peripheral surface of the intermediate transfer body, a second transfer device having a second transfer member which second transfers the toner image transferred to the outer peripheral surface of the intermediate transfer body to the surface of a recording medium, a cleaning device having a cleaning blade which cleans the outer peripheral surface of the intermediate transfer body, and the inorganic compound particle supply member described in any one of the items (((1)) to (((11))) including an inorganic compound particle supply member which supplies inorganic compound particles to the outer peripheral surface of the intermediate transfer body.

(((13)))

A transfer device including a recording medium transport body which transports a recording medium, a transfer member which transfers the toner image formed on the surface of an image holding member to the recording medium transported by the recording medium transport body, a cleaning device having a cleaning blade which cleans the outer peripheral surface of the recording medium transport body, and the inorganic compound particle supply member described in any one of the items (((1)) to (((11))) which is disposed in contact with the outer peripheral surface of the recording medium transport body and supplies inorganic compound particles to the outer peripheral surface of the recording medium transport body.

(((14)))

An image forming apparatus including a toner image forming device which has an image holding member and forms a toner image on the surface of the image holding member, and the transfer device described in (((12))) which transfers the toner image formed on the surface of an image holding member to the surface of the recording medium.

(((15)))

An image forming apparatus including a toner image forming device which has an image holding member and forms a toner image on the surface of the image holding member, and the transfer device described in (((13))) which transfers the toner image formed on the surface of an image holding member to the surface of the recording medium.

What is claimed is:

1. An inorganic compound particle supply member comprising inorganic compound particles, wherein the Young's modulus of the inorganic compound particle supply member is lower than the Young's modulus of a supply object to be supplied with the inorganic compound particles.

2. The inorganic compound particle supply member according to claim 1, wherein the inorganic compound particles are spherical inorganic compound particles.

3. The inorganic compound particle supply member according to claim 2, wherein the aspect ratio of the spherical inorganic compound particles is 2 or less.

4. A transfer device comprising:

an intermediate transfer body to whose outer peripheral surface a toner image is transferred;

a first transfer device having a first transfer member that first transfers the toner image formed on the surface of an image holding member to the outer peripheral surface of the intermediate transfer body;

a second transfer device having a second transfer member that second transfers the toner image transferred to the outer peripheral surface of the intermediate transfer body to the surface of a recording medium;

a cleaning device having a cleaning blade that cleans the outer peripheral surface of the intermediate transfer body; and the inorganic compound particle supply member according to claim 3, including an inorganic compound particle supply member that is disposed in contact with the outer peripheral surface of the intermediate transfer body and supplies inorganic compound particles to the outer peripheral surface of the intermediate transfer body.

5. A transfer device comprising:

an intermediate transfer body to whose outer peripheral surface a toner image is transferred;

a first transfer device having a first transfer member that first transfers the toner image formed on the surface of an image holding member to the outer peripheral surface of the intermediate transfer body;

a second transfer device having a second transfer member that second transfers the toner image transferred to the outer peripheral surface of the intermediate transfer body to the surface of a recording medium;

a cleaning device having a cleaning blade that cleans the outer peripheral surface of the intermediate transfer body; and the inorganic compound particle supply member according to claim 2, including an inorganic compound particle supply member that is disposed in contact with the outer peripheral surface of the intermediate transfer body and supplies inorganic compound particles to the outer peripheral surface of the intermediate transfer body.

6. The inorganic compound particle supply member according to claim 1, wherein the specific gravity of the inorganic compound particles is 3.0 or less.

7. A transfer device comprising:

an intermediate transfer body to whose outer peripheral surface a toner image is transferred;

a first transfer device having a first transfer member that first transfers the toner image formed on the surface of an image holding member to the outer peripheral surface of the intermediate transfer body;

a second transfer device having a second transfer member that second transfers the toner image transferred to the outer peripheral surface of the intermediate transfer body to the surface of a recording medium;

a cleaning device having a cleaning blade that cleans the outer peripheral surface of the intermediate transfer body; and the inorganic compound particle supply member according to claim 6, including an inorganic compound particle supply member that is disposed in contact with the outer peripheral surface of the intermediate transfer body and supplies inorganic compound particles to the outer peripheral surface of the intermediate transfer body.

8. The inorganic compound particle supply member according to claim 1, wherein the inorganic compound particles are silica particles.

9. A transfer device comprising:

an intermediate transfer body to whose outer peripheral surface a toner image is transferred;

a first transfer device having a first transfer member that first transfers the toner image formed on the surface of an image holding member to the outer peripheral surface of the intermediate transfer body;

a second transfer device having a second transfer member that second transfers the toner image transferred to the outer peripheral surface of the intermediate transfer body to the surface of a recording medium;

a cleaning device having a cleaning blade that cleans the outer peripheral surface of the intermediate transfer body; and the inorganic compound particle supply member according to claim 8, including an inorganic compound particle supply member that is disposed in contact with the outer peripheral surface of the intermediate transfer body and supplies inorganic compound particles to the outer peripheral surface of the intermediate transfer body.

10. The inorganic compound particle supply member according to claim 1, wherein the content of the inorganic compound particles relative to the inorganic compound particle supply member is 10% by mass or more and 70% by mass or less.

11. A transfer device comprising:

an intermediate transfer body to whose outer peripheral surface a toner image is transferred;

a first transfer device having a first transfer member that first transfers the toner image formed on the surface of an image holding member to the outer peripheral surface of the intermediate transfer body;

a second transfer device having a second transfer member that second transfers the toner image transferred to the outer peripheral surface of the intermediate transfer body to the surface of a recording medium;

a cleaning device having a cleaning blade that cleans the outer peripheral surface of the intermediate transfer body; and the inorganic compound particle supply member according to claim 10, including an inorganic compound particle supply member that is disposed in contact with the outer peripheral surface of the intermediate transfer body and supplies inorganic compound particles to the outer peripheral surface of the intermediate transfer body.

12. The inorganic compound particle supply member according to claim 1, wherein the ratio (Young's modulus of the inorganic compound particle supply member/Young's modulus of the supply object) of the Young's modulus of the inorganic compound particle supply member to the Young's modulus of the supply object is 0.1 or less.

13. The inorganic compound particle supply member according to claim 1, wherein the Young's modulus of the inorganic compound particle supply member is 1500 Mpa or less.

14. The inorganic compound particle supply member according to claim 1, wherein the inorganic compound particles are spherical silica particles.

15. The inorganic compound particle supply member according to claim 1, wherein the content of the inorganic compound particles relative to the inorganic compound particle supply member is 10% by mass or more and 70% by mass or less; and the ratio (Young's modulus of the inorganic compound particle supply member/Young's modulus of the supply object) of the Young's modulus of the inorganic compound particle supply member to the Young's modulus of the supply object is 0.1 or less.

16. The inorganic compound particle supply member according claim 15, wherein the Young's modulus of the inorganic compound particle supply member is 1500 Mpa or less.

17. A transfer device comprising:

an intermediate transfer body to whose outer peripheral surface a toner image is transferred;

a first transfer device having a first transfer member that first transfers the toner image formed on the surface of an image holding member to the outer peripheral surface of the intermediate transfer body;

a second transfer device having a second transfer member that second transfers the toner image transferred to the outer peripheral surface of the intermediate transfer body to the surface of a recording medium;

a cleaning device having a cleaning blade that cleans the outer peripheral surface of the intermediate transfer body; and the inorganic compound particle supply member according to claim 1, including an inorganic compound particle supply member that is disposed in contact with the outer peripheral surface of the intermediate transfer body and supplies inorganic compound particles to the outer peripheral surface of the intermediate transfer body.

18. An image forming apparatus comprising:

a toner image forming device that has an image holding member and forms a toner image on the surface of the image holding member; and the transfer device according to claim 17 that transfers the toner image formed on the surface of an image holding member to the surface of a recording medium.

19. A transfer device comprising:

a recording medium transport body that transports a recording medium;

a transfer member that transfers the toner image formed on the surface of an image holding member to the recording medium transported by the recording medium transport body;

a cleaning device having a cleaning blade that cleans the outer peripheral surface of the recording medium transport body; and the inorganic compound particle supply member according to claim 1, including an inorganic compound particle supply member that is disposed in contact with the outer peripheral surface of the recording medium transport body and supplies inorganic compound particles to the outer peripheral surface of the recording medium transport body.

20. An image forming apparatus comprising:

a toner image forming device that has an image holding member and forms a toner image on the surface of the image holding member; and the transfer device according to claim 19 that transfers the toner image formed on the surface of an image holding member to the surface of a recording medium.

* * * * *